Nov. 3, 1964         R. M. ROSSER         3,155,112
CHECK VALVE STRUCTURE FOR THE MINIMIZATION OF WATER HAMMER
Filed Jan. 23, 1961                     2 Sheets-Sheet 1
FIG. 1
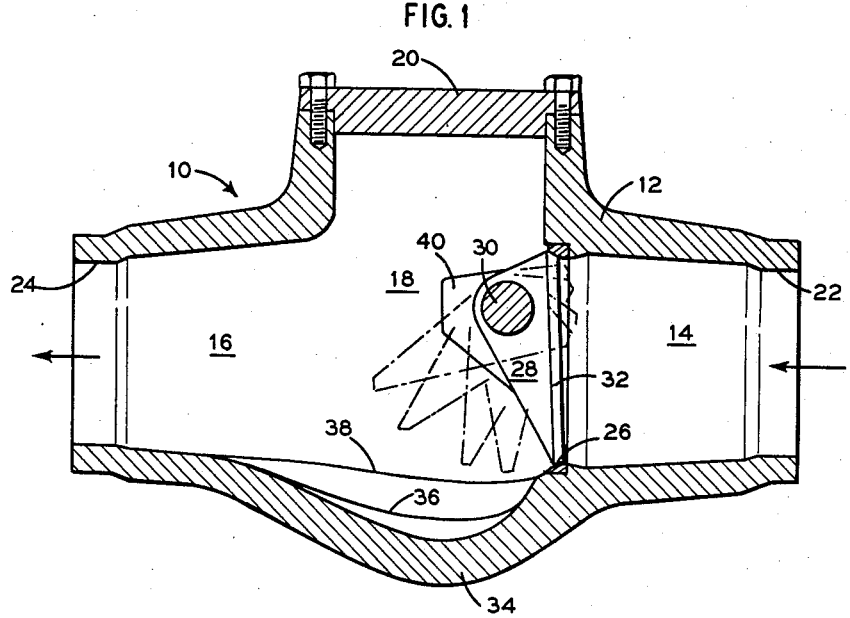
FIG. 5
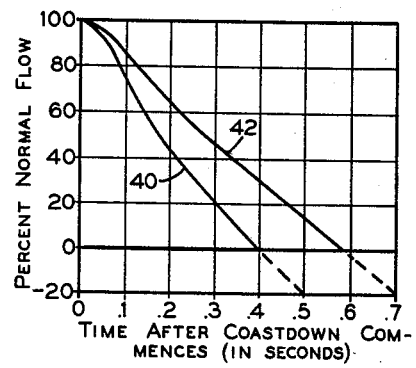
INVENTOR.
Ralph M. Rosser
BY
ATTORNEY

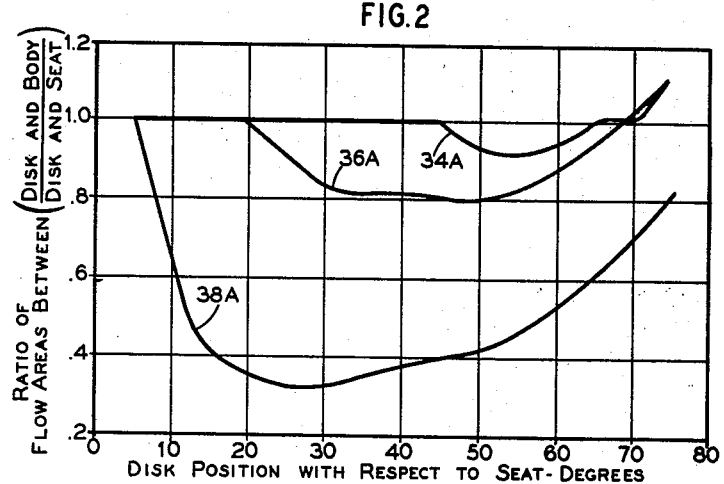
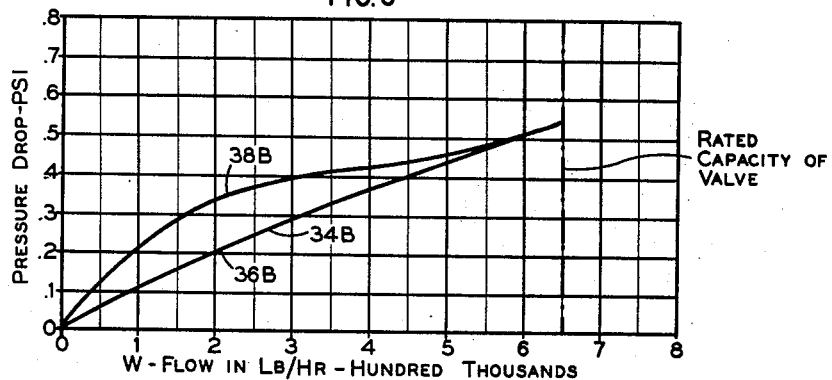
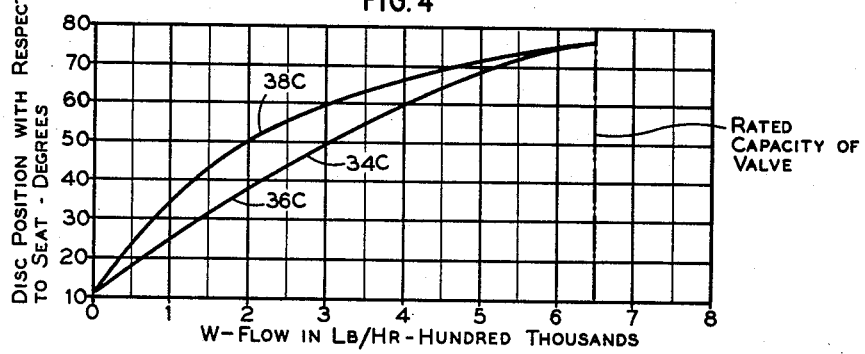

United States Patent Office 3,155,112
Patented Nov. 3, 1964

3,155,112
CHECK VALVE STRUCTURE FOR THE MINIMIZATION OF WATER HAMMER
Ralph M. Rosser, Lynchburg, Va., assignor to The Babcock & Wilcox Company, New York, N.Y., a corporation of New Jersey
Filed Jan. 23, 1961, Ser. No. 84,332
2 Claims. (Cl. 137—527.8)

This invention relates in general to a novel valve structure for the elimination or minimization of water hammer and more particularly to an improvement for this purpose as applied to a flow actuated check valve. More specifically, this invention is directed to an improvement for the reduction of such water hammer in a tilting or pivotally suspended disk type of check valve.

In reversible flow fluid transport systems, it is often desirable to provide a means actuated by the flowing liquid whereby reverse flow is prohibited. Such a means is a pivotally suspended disk type of check valve which is automatically opened by the force of the forward flowing fluid and which, upon flow stoppage or reversal, closes automatically to prevent reverse flow through the system. Check valves of this type are subject, upon flow reversal, to water hammer which is a pressure shock instigated by the stoppage of the moving disk and the column of water thereadjacent as the disk seats on the valve seat. This pressure shock is transmitted or propagated throughout the system through the fluid and the piping. As piping systems, and especially the check valves, have increased in size with increased flow rates, this pressure shock, or water hammer, has become increasingly troublesome, and and in large, high flow rate systems have even become destructive.

Such destruction has appeared in the form of broken piping, etc., and has become especially critical in such systems as pressurized water type of nuclear reactors. Nuclear reactors provide a system having high capacity, multipathed parallel flow circuits in which one circuit may be shut down independently of the other circuits, thus providing a reversible flow situation within the shut down circuit due to the continued operation of the other circuits. Thus water hammer may develop upon the closure of the check valve in the shut down circuit. The water hammer so resulting is damaging not only to the piping system, but is especially injurious to components within the reactor which are not normally subjected to such pressure shocks and are of a close tolerance design. Thus the elimination or minimization of water hammer becomes especially important in the design of check valves for use in a nuclear reactor system.

In check valves of the prior art many attempts have been made aimed at the reduction or elimination of water hammer. Included in these attempts have been the positioning of the check disk pivot in a particular relationship with the valve seat, counterbalancing the disk, providing a hydraulic or spring bias at the disk pivot, and giving the disk a particular shape with relation to the flow thereover. Each of these attempts have been less than fully satisfactory in that they have not fully protected against the incidence of water hammer. Further, such attempts have added to the complexity of the valves and, in turn, have increased the fabrication and material costs involved.

It is thus the purpose of the present invention to provide a check valve having a unique body configuration which, by itself or in combination with any of the previous methods of reducing water hammer, will materially reduce, if not eliminate, the resulting water hammer as compared to a valve not utilizing this invention.

Accordingly, the present invention provides, in a flow system subject to water hammer, a check valve comprising a body having an inlet and an outlet, a valve seat arranged in the body transversely to the longitudinal centerline of the inlet, and a closure member movably mounted in the body to sealingly mate with the valve seat between the inlet and the outlet, the body having a portion between the inlet and the outlet offset to provide a flow area between the closure member and the body offset substantially equal to the flow area between the closure member and the valve seat substantially throughout the travel of the closure member.

Additionally, the present invention provides a check valve with a body offset according to the above description in combination with a counterbalanced closure member which is pivotally mounted within the valve body on a pivot which is disposed to one side of the axis of the inlet.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of the invention.

Of the drawings:
FIG. 1 is a cross sectional view of a valve body employing the present invention;
FIG. 2 is a graphical representation of the ratio of the flow area between the valve closure member or disk and the valve body and the flow area between the valve closure member and the valve seat versus disk position with respect to the seat;
FIG. 3 is a graphical representation of pressure drop versus flow for the valve shown in FIG. 1;
FIG. 4 is a graphical representation of valve opening versus flow for the valve shown in FIG. 1; and
FIG. 5 is a graphical representation showing flow coastdown, which may be defined as percent of normal flow with respect to time subsequent to cessation of the applied pressure on the system.

FIG. 1 shows a vertical cross section of a check valve 10 in which a valve body 12 has an inlet 14 and an outlet 16 communicating with a body cavity 18. The body cavity is provided with a removable closure 20 which permits access to the interior of the valve for initial assembly or for subsequent maintenance. The inlet and outlet portions of the valve are furnished with suitable ends, 22 and 24 respectively, for joining the valve into a piping system. In this instance, welding fitting ends are illustrated but other types of connecting fittings, for example flanges or screwed connections, may just as easily be used. Disposed transversely to the longitudinal centerline of inlet 14 at the intersection of the inlet with the body cavity 18 is a valve seat 26, formed of a ground and hardened material as is well known in the art. A valve closure member, or disk, 28 is pivotally mounted in the body cavity 18 by a pivot pin 30 which is disposed therein adjacent to but above the longitudinal centerline of the inlet portion, substantially as illustrated. The valve disk 28 has a circumferential face 32 which sealingly mates with the valve seat 26 to prevent reverse flow through the valve. A counterweight 40 may be used with the valve disk and would be positioned on the downstream side of the disk with respect to inlet 14. Such a counterweight is thoroughly described in Pat. No. 2,864,-401, wherein it is shown that the counterweight shifts the effective center of gravity of the disk to the downstream side of the axis of pivot 30 to assure a closing moment of sufficient force to seat the disk upon cessation of normal fluid flow from the inlet to the outlet.

A portion 34 of the valve body 12 on the opposite side of the axis of the inlet 14 from the pivot 30 is offset as illustrated in FIG. 1. This offset portion or curvature is so proportioned as to provide a flow area between the disk and the body substantially equal to the flow area between the disk and the valve seat throughout the travel of the disk. This relationship is graphically illustrated by curve 34A in FIG. 2 which shows, in terms of degrees of rotation of the disk about the pivot 30, that this area to area ratio for body offset 34 is approximately 1 throughout the range of travel of the valve disk. In the specific example illustrated, at the relative disk position of 0° the valve is fully closed, and at a relative disk position of 76° the valve is fully open.

The valve disk 28 is also shown in a number of phantom positions in FIG. 1 to aid in the visualization of the area to area ratio as described above. Further, curvature 36, in FIG. 1, describes a valve body offset which, over a major portion of its range of use, has an area to area ratio of approximately 0.8, as illustrated by curve 36A in FIG. 2. Similarly, valve body curvature 38, in FIG. 1, illustrates a valve body having practically no offset and with an area to area ratio of approximately 0.4 over a substantial portion of the range of disk travel as shown by curve 38A in FIG. 2.

It has been my discovery that, in a check valve, regardless of other constructional features, the use of a body offset as herein described will result in a reduction in the incidence and intensity of water hammer from that occurring in a similar valve without the offset. The degree of offset which forms the heart of this invention is one which provides that the ratio of the flow area ($a$) between the valve disk and the valve body to the flow area ($A$) between the valve disk and the valve seat will be substantially equal to $1 (a/A=1)$ substantially throughout the travel of the valve disk. While these area ratios optimally are 1:1, experiments have shown that the $a$ to $A$ ratio may fall within the range of 0.8 to 1 and still provide a significant reduction in water hammer, especially where the $a/A$ ratio approaches 1 at the near closed position of the disk as may be seen in curves 34A and 36A of FIG. 2. Incidentally, it may be seen that as the disk approaches the full open position both of the bodies 34 and 36 with offsets providing flow areas falling in the above range, i.e. ratios between 0.8 and 1, yield an $a$ to $A$ ratio that increases slightly above 1.

This reduction in water hammer results from the fact that in a reversible flow system, such as the multi-looped reactor system described, above, when the force generating the flow is cut off, the flow will slow down, stop, and reverse, i.e. coastdown, in a finite time. Each fluid flow system will have its own coastdown characteristics based upon several factors inherent in the system. Two such system coastdown curves, 40 and 42, are illustrated in FIG. 5, having coastdown times of 0.4 and 0.59 second, respectively, before reverse of flow occurs. In a system with a flow coastdown characteristic similar to one of those shown in FIG. 5, if the valve disk is not seated when the flow reaches zero, the flow will reverse and force the disk to close the remainder of the way. Since the intensity of water hammer is proportional to the velocity of the column of water being stopped, it may readily be seen that the farther the disk is from the valve seat when the flow reaches zero, the higher the reverse flow velocity that will be achieved during the time it takes for the disk to finally close and the greater the resulting water hammer. It follows from this that water hammer will be minimized for any specific valve when the valve disk is as close to the valve seat as possible throughout the range of flow rates anticipated. This I have achieved by providing the valve body offset described above, such an offset permitting, for any given amount of disk opening within the rated capacity of the valve, a higher flow rate than that obtainable in a valve not having the body offset. This is graphically illustrated in FIG. 4 which shows the amount of valve disk movement for various flow rates for the three types of body configurations shown in FIG. 1. In FIG. 4, the curves labelled 34C, and 36C describe the relationship of flow rate with respect to disk movement for the body offsets 34 and 36, respectively, while curve 38C describes the disk movement in a valve having body configuration 38, i.e. no offset.

FIGURE 3 is included to graphically illustrate the pressure drop versus flow occurring across the valve described above, wherein curves 34B, 36B, and 38B, are the pressure drops for each of the body configurations 34, 36 and 38, respectively. Here, as in FIG. 4, it is apparent that bodies 34 and 36 both provide similar flow characteristics while having $a$ to $A$ ratios lying in the range between 0.8 and 1 as shown in FIG. 2.

The data from which the curves in FIGS. 2, 3, and 4 were drawn was obtained from valves substantially like that shown in FIG. 1, without the counterweight 40, wherein 8 inch valves were used having a tilting disk which weighed 21.4 pounds. The effective moment arm of the center of mass of each disk about its pivot was 1.66 inches and each valve hung open 10.5 degrees at zero flow. These valves have a full flow rating of approximately 650,000 pounds of water at 70° F. per hour and have no hydraulic or spring bias applied to the pivot point. When these valves were placed in a flow system having a coastdown characteristic like that of curve 40 in FIG. 5, i.e. a coastdown time of 0.4 second, the valves having the offsets 34 and 36 required 0.436 second to close, allowing a reverse flow velocity of 0.765 feet per second to occur generating a water hammer surge of 49 p.s.i. When the valve having no offset, i.e. body curvature 38, was placed in this same flow system, it required 0.489 second to close and permitted a reverse flow velocity of 1.93 feet per second to occur generating a water hammer surge of 123.5 p.s.i. It may thus be seen that under the described conditions, utilizing valves similar in every respect except for the body offset, the valves having the body offset with an $a$ to $A$ ratio in the range of 0.8 to 1 achieve a reduction in water hammer surge of over 58 percent.

In flow systems having longer coastdown times the reduction in water hammer will not be as dramatic as in those with very fast coastdown times, but it will still be substantial. This is due in part to the fact that, in systems having a longer coastdown time, the valve disk may more easily be maintained in equilibrium with the flow rate and thus come closer to being closed at the instant of flow reversal. One example of this is obtained from tests involving two 18 inch valves placed in a flow system having a full flow rate of 7,400,000 pounds of water at 70° F. per hour and having a coastdown time of 0.59 second as shown by curve 42 in FIG. 5. These valves are identical except for the body offset and each had disks weighing 200 pounds. Each valve hung open 10 degrees at zero flow and had a spring bias at the pivot of 700 inch pounds to compensate for the weight of the disk and the much higher rate of flow therethrough. In this example the valve without the body offset generated a water hammer surge of 273 p.s.i., while the valve with the body offset had a water hammer surge of only 215 p.s.i., a reduction of over 20 percent.

By applying my discovery, of using a body offset having an $a$ to $A$ ratio substantially equal to 1 to any check valve subject to water hammer it is possible to substantially reduce the surge and resultant water hammer which occurs upon rapid cessation of flow.

While in accordance with the provisions of the statutes I have illustrated and described herein the best form and mode of operation of the invention now known to me, those skilled in the art will understand that changes may be made in the forms of apparatus disclosed without departing from the spirit of the invention covered by my claims, and that certain features of my invention may sometimes be used to advantage without a corresponding use of other features.

What is claimed is:

1. A check valve, for use in a flow system subject to water hammer, comprising a body having an inlet and an outlet at opposite ends thereof, a valve seat arranged in said body transversely to the longitudinal centerline of said inlet, a disc-shaped closure member pivotally mounted in said body at the downstream side of said seat to sealingly mate therewith, said body having a dished-out portion with an arcuate bottom forming a continuous curve commencing at the downstream side of said seat, said dished-out portion being offset with respect to the line of travel of the peripheral edge of said closure member during valve closing movement and proportioned to provide a flow area between the peripheral edge of said closure member and said body substantially equal to the flow area between said closure member and said valve seat throughout the major portion of the range of travel of said closure member.

2. A check valve, for use in a flow system subject to water hammer, comprising a body having an inlet and an outlet at opposite ends thereof, a valve seat arranged in said body transversely to the longitudinal centerline of said inlet, a counterbalanced disc-shaped closure member pivotally mounted in said body at the downstream side of said seat to sealingly mate therewith, said body having a dished-out portion with an arcuate bottom forming a continuous curve commencing at the downstream side of said seat, said dished-out portion being offset with respect to the line of travel of the lower peripheral edge of said closure member during valve closing movement and proportioned to provide a flow area between the peripheral edge of said closure member and said body substantially equal to the flow area between said closure member and said valve seat throughout the major portion of the range of travel of said closure member.

References Cited in the file of this patent
UNITED STATES PATENTS

| | | |
|---|---|---|
| 647,739 | Barrett | Apr. 17, 1900 |
| 849,466 | Donaldson | Apr. 9, 1907 |
| 2,864,401 | Carr | Dec. 16, 1958 |